United States Patent

Hissen

[11] Patent Number: 5,814,375
[45] Date of Patent: Sep. 29, 1998

[54] PROCESS AND DEVICE FOR AUTOMATICALLY COATING OBJECTS WITH A SPRAYER

[75] Inventor: Hans Hissen, Darmstadt, Germany

[73] Assignee: Cegelec AEG Anlagen und Automatisierungstechnik GmbH, Frankfurt, Germany

[21] Appl. No.: 808,157

[22] Filed: Feb. 28, 1997

Related U.S. Application Data

[63] Continuation of Ser. No. 302,920, filed as PCT/EP93/00611 Mar. 18, 1993, abandoned.

[30] Foreign Application Priority Data

Mar. 21, 1992 [DE] Germany ............... 42 09 279.5

[51] Int. Cl.⁶ .................. B05D 1/02; B05B 3/00
[52] U.S. Cl. .................. 427/421; 427/424; 118/668; 118/323; 901/43
[58] Field of Search ............... 901/43; 118/323, 118/668; 427/424, 421

[56] References Cited

U.S. PATENT DOCUMENTS

| | | | |
|---|---|---|---|
| 3,619,311 | 11/1971 | Rose et al. | 118/323 |
| 4,108,105 | 8/1978 | Wiggins | 118/323 |
| 4,278,046 | 7/1981 | Clarke et al. | 118/323 |
| 4,919,967 | 4/1990 | Handke et al. | 118/323 |
| 4,931,322 | 6/1990 | Yamamoto et al. | 118/323 |
| 4,985,283 | 1/1991 | Ogata et al. | 427/424 |
| 5,067,436 | 11/1991 | Matsushima et al. | 118/676 |
| 5,324,547 | 6/1994 | Ohhashi et al. | 427/424 |

FOREIGN PATENT DOCUMENTS

| | | |
|---|---|---|
| 0084523 | 7/1983 | European Pat. Off. . |
| 1323044 | 2/1963 | France . |
| 3014114 | 4/1982 | Germany . |
| 2013934 | 8/1979 | United Kingdom . |
| 2118740 | 11/1983 | United Kingdom . |
| 89/06181 | 7/1989 | WIPO . |

OTHER PUBLICATIONS

Werner Keul: "Oberflächentechnik", Hannover Messe 1980. VDI–Z, vol. 122, No. 14, Jul. 1980, Düsseldorf, Germany, pp. 577–581.

H. Benninghoff: "Materialfluss in Lackier–und Beschichtungsanlagen". In: Metalloberfläche [Metal Surface] 38, 1984, 12, pp. 527–530. (no month date).

*Primary Examiner*—Katherine A. Bareford
*Attorney, Agent, or Firm*—Spencer & Frank

[57] ABSTRACT

A method for automatically coating objects with a spraying device which includes at least one atomizer that is moved along paths determined by programs. For respective objects or segments of objects, which essentially differ with respect to the dimensions, a program is provided which is modified as a function of the length of the respective object or segment, which length is allocated to a direction of a Cartesian coordinate system, for predetermining the path of the atomizer in the direction of the length of the object. By means of dimension data that are inserted into the program, the paths to be followed by the atomizer are constantly adapted along the predetermined path in at least one direction that extends at a right angle to this direction.

8 Claims, 3 Drawing Sheets

5,814,375

PROCESS AND DEVICE FOR AUTOMATICALLY COATING OBJECTS WITH A SPRAYER

This application is a continuation of application Ser. No. 08/302,920, filed Dec. 22, 1994, now abandoned. This is a national stage application of PCT/EP93/00611, filed Mar. 16, 1993.

BACKGROUND OF THE INVENTION

1. Field of the Invention

The invention relates to a method and a device for automatically coating objects with a spraying device including at least one spraying tool which is moved with a 3 or 4 axis numerical control (hereinafter 3/4-axis) device along paths determined by programs, while the respective object is transported in one direction.

2. Background Information

Devices for automatically coating objects are known. In DE-PS 30 14 114, such a device is described in which the objects to be coated are guided through certain coating positions on or at a transport device. In this device, spray guns are disposed to be displaced and positioned on positioning stands in three directions that are perpendicular to one another. A control device contains a program by means of which the coating steps, the types of objects to be coated, the beginning and end of the spraying process of the respective spray guns and other coating parameters are determined.

Surfaces, particularly of vehicle parts such as bodies, are coated by 3/4-axis spraying machines that move over the surface to be coated, for example, in an oscillating fashion and transversely to the direction of transport. The suitable coating movements are determined by programs in which paths are stored according to which the spraying tools are moved.

For the path points on the path of movement, coating parameters must further be determined which relate to the control of the spraying tool(s). These coating parameters determine, for example, the quantity of paint, the atomizer air, the horn air, or the intensity and shape of the spraying stream. The movement program, including the setting of the coating parameters, can be created in accordance with the "teach-in" method. Because of the large number of necessary path points and coating parameters, which are partially dependent on one another, "offline" programming is arduous and time-consuming.

For larger objects, the movement programs are very extensive and therefore require a large storage capacity. When larger objects differing from one another are to be coated one after the other by the same spraying device, the different movement programs must be respectively called up. It occurs that identical objects having different relative velocities between spraying tools and objects are coated. In general, the objects are moved past the spraying tools along one coordinate direction of a Cartesian coordinate system; during coating, the tools are controlled by the programs to move in the two other directions of the coordinate system. The movement programs that apply identical objects may have to be changed later for different relative velocities. Due to the number of stored path points and path parameters associated with individual points, an adaptation of the movement program to different velocities at which the path is to be followed is particularly laborious and time-consuming. For the coating of objects with different paint materials, the necessary movement paths and thus the movement programs are likewise different. Therefore, different movement programs must be created and called up for identical objects but different paint applications, which means great complexity, particularly for large objects, e.g. vehicle bodies. This is where the invention comes in.

SUMMARY OF THE INVENTION

With the invention, the problem should be solved for coating objects with a desired quantity of paint with a low complexity of movement programs and with less required storage capacity for the movement programs, even at different velocities at which the objects are moved past at least one coating tool in the one direction of a Cartesian coordinate system.

This problem is solved in accordance with the invention in that contour data related to the dimensions of the respective object to be coated in the conveying direction are superposed onto velocity- and/or time-dependent path data for creating the path to be covered by the spraying tool.

The machine installer makes available, for example, a pool of machine movements stored in movement programs. These are called up from a memory as a function of the object or tool. The tool is continuously moved past the coating machine, during which the dimensions of the object change transversely to the conveying direction in a predetermined manner. These changes in distance are communicated to the control device of the spraying tool. The velocity- or time-dependent path movements are superposed onto the changes in distance, so that the desired constant painting distance is assured over the surface to be coated.

The method has the following advantages:

In comparison to previous movement programs, less storage capacity is necessary, so that smaller control systems can also perform the method. The method can be performed with simple memory-programmable control units. Therefore, no robotic control is necessary, but the method can likewise be performed with one.

The method is simple to perform, because comprehensible data quantities arise, subdivided into path and contour data, which can only be changed by certain persons by means of suitable access controls, e.g., path data are only monitored by the machine installer, and contour data by coating of the process in progress.

Movement paths for surfaces of certain sizes, that is, dimensions, can be stored without it being necessary to establish distances between the movement paths of one plane that extends, for example, perpendicularly through the first coordinate axis.

The movement programs for certain surfaces can be used to control the movement paths of spraying tools on other objects without difficult adaptation work.

Identical surfaces often appear in many types of products. For example, identical or identically-configured surfaces are present on automobile bodies of various types. For these surfaces, which have somewhat larger dimensions, extensive movement programs are required which can be used for numerous types by means of simple adaptation to the respective contour data.

The complexity of the programming of the movement paths is decisively reduced by this. Particularly for surfaces of uniform shape, it is often sufficient to modify the movement programs with the aid of the contour data associated with a contour line.

The influence of the velocity of the spraying tool, which is a function of the transport velocity, permits the transport velocity to be changed without it being necessary for different movement programs to be available for different transport velocities. With the modification of the paths covered by the spraying tools(s), which is a function of the transport velocity, a uniform application is achieved, independently of the transport velocity of the object to be treated, and the same relative velocity is maintained between the respective spraying tool and the surface to be coated.

The contour line is preferably determined by the points of intersection of a plane with the surface to be coated. This plane is, in particular, that in which the coordinate axis and a second coordinate that bisects this axis at a right angle lie; this axis passes through the same point of origin (zero point) and has the same direction as the displacement of the spraying tool with respect to the respective object.

The movement paths for the respective surface are determined by a number of points which respectively relate to a coordinate system and are passed through in a predetermined sequence by the spraying tool or the spraying tool carrier.

Intermediate points between each two contiguous points of a movement path are calculated by means of interpolation. When the surfaces to be coated are of the same dimensions and only have a different position in space depending on the contour in different objects, it is only necessary to adapt the coordinate values of the path points to the other position of the surface in space in order to adapt the movement program to another object having the identical surface. Depending on the object, the same changes in coordinates or, for example, constant changes only in one coordinate direction with the coordinate values being maintained in the other directions often result for many path segments. In this case a modification can be performed particularly quickly and simply.

The modification of the movement program of a surface during transport of the respective object can often be accomplished in that the path of the spraying tool(s) determined by a movement program is maintained in at least one direction of the Cartesian coordinate system, and in that the path points of the path are modified by means of correction data associated with the position of the surface with respect to a predetermined contour in at least one direction perpendicular to this direction.

If the contour is constant, the points are also correspondingly adapted.

In this embodiment it is likewise not necessary to create movement programs for each object of a series of objects which at least have differences only in the contour when seen from one side. Thus, the program complexity can also be reduced here. Also, less storage space is required for the software. The creation of a program for the paths to be covered by the spraying tools during coating of a larger surface generally requires great complexity. The movement program created once for this is modified according to the invention as a function of the contour, and can therefore be used for a number of further objects in modified form.

The adaptation of the program is particularly simple when objects only differ from one another in width.

Depending on the object, the programmed paths must then only be displaced with respect to a central plane of symmetry of the objects. However, it is also advisable to change the reversal points of the programmed paths as a function of the vertical expansion in the predetermined program.

In a preferred embodiment, one path program is ended and another path program differing from it is begun for a predeterminable point in space.

With this measure different path programs can be coupled with one another. The coupling takes place at locations at which identical space coordinates are present, namely in the turning points of the paths. Thus, smooth transitions, that is, smooth machine movements, are possible.

For the device, the problem is solved in accordance with the invention in that a second, memory-programmable control unit which includes the contour data for influencing the movement program, which are dependent on the type, and atomization parameters is connected to the first memory-programmable control unit for adaptation of the movement program.

In this arrangement a task division that has numerous advantages takes place between the first and second memory-programmable control units.

The first memory-programmable control unit in particular is a component of a position-control circuit or position-regulating circuit for the spraying device, and obtains the offset data for the contour-dependent path movement from the second memory-programmable control unit.

BRIEF DESCRIPTION OF THE DRAWINGS

The invention is described in detail below by way of an embodiment illustrated in a drawing figure, from which further details, features and advantages ensue.

Shown are in.

DETAILED DESCRIPTION OF THE PREFERRED EMBODIMENTS

Figure 1:
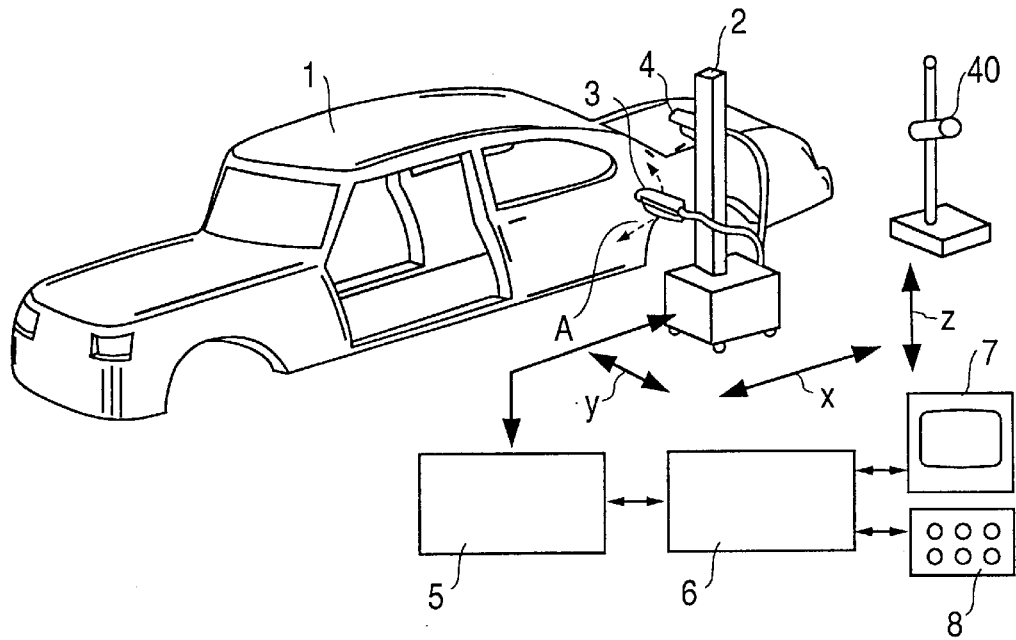
FIG. 1 a schematic representation in perspective of a device for automatically coating objects, which includes a spraying device.

A device for automatically coating vehicle bodies 1 includes a positioning stand 2, on which, as the spraying tools, one or two atomizers 3, 4 are disposed so as to be displaceable in three axes. The axes of a Cartesian coordinate system are designated as x, y, z, in FIG. 1.

The atomizers 3, 4 spray paint, for example in a way known per se, particularly electrostatically. For this purpose the atomizers 3, 4 are connected to a paint supply, not shown.

The vehicle bodies 1 are moved past the stand 2, which has positioning drives not shown in detail, which are connected to a first memory-programmable control unit 5. A path program that determines the movement of the atomizers 3, 4 is stored in the control unit 5. According to the program, the atomizers 3, 4 are guided along a path, e.g. with oscillating movements indicated by A in FIG. 1, and the vehicle bodies 1 are thereby coated.

The atomizers, in the shape of bells, execute oscillating movements which are superposed onto a programmed path followed at a low painting velocity. It is also possible to employ spray guns. In general, one spray gun is provided per side of the object. The spray gun moves along the predetermined path at a higher painting velocity without oscillating movements. The paths can also be curved at the edges of the object to match curves at the edges. The path program is created in the teach-in method.

In the use of bell-shaped atomizing heads, the oscillation movements are already made part of the paths, i.e. they need not be created in the teach-in method. The bell-shaped atomizing heads oscillate with approximately 30–50 cm amplitudes in side machines for vehicle bodies. A second programmable control unit 6, with which a monitor 7 and an input keyboard 8 can be connected, is connected to the first control unit 5.

Figure 2:
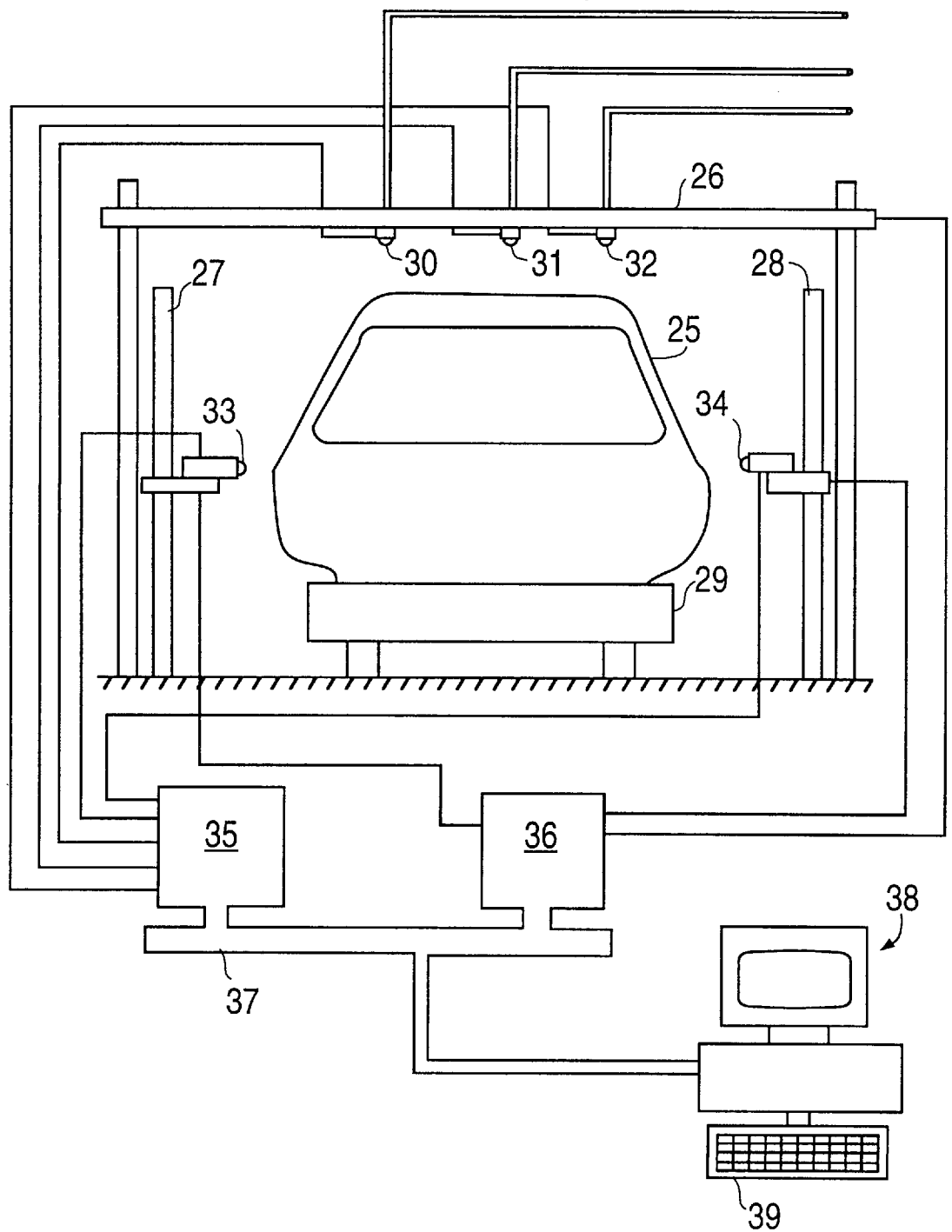
FIG. 2 another embodiment of a device for coating objects, shown schematically from the front.

FIG. 2 shows an automatic surface-painting machine for automobile bodies 25. In general, a plurality of automatic surface-painting machines can be combined into an automatic machine assembly. The automatic surface-painting machine according to FIG. 2 comprises a coating device 26 for the roof of the body 25, and two coating devices 27, 28, one for each side of the body 25. A path control unit is provided for each coating device. The drives of the coating devices are not shown in detail. The body 25 is transported by a conveyor belt 29. The path control units are synchronized with the conveyor belt 29.

Activation and deactivation locations are established on the programmable paths for the paint-spraying elements. The coating device 26 for the roof of the body 25 includes as its paint-spraying elements three atomizers 30, 31, 32 disposed adjacently in a row as spraying tools. The coating devices 27, 28 for the sides of the body include atomizers 33, 34, respectively. The atomizers 30 through 34 each have spraying tubes, not shown in detail, with bell-shaped atomizing heads secured thereto. Rotary drives are provided which rotate the spraying tubes.

During the rotational movements, coating material and air are supplied to the bell-shaped atomizing heads in the proper ratio and in the proper quantity under the control of a memory-programmable control unit 35. The material flow exiting the bell-shaped atomizing heads can be controlled by means of a flow quantity control or flow quantity regulation, or by an automatic metering unit. A further memory-programmable control unit 36 is provided for the movement of the bell-shaped atomizing heads along predetermined paths. The two control units 35, 36 are connected to one another and with a personal computer 38 via a bus 37.

The control unit 35 is decisive for technological parameters of the coating device, and contains the corresponding process parameters, e.g. coating parameters and the type of the respective vehicle body to be coated. The drives of the atomizers 34, 35 and the elements for conveying and metering the coating material are likewise connected with the bus 37.

The personal computer 38 is employed, among other things, for parametrizing the automatic surface-painting machines. To this end a window-oriented operating system is provided which can be used online and offline, and includes as an input device a keyboard 39, a mouse and/or a touch-screen. For parametrizing the various elements of the automatic surface-painting machines, programs are provided which are called up by way of a menu. Among other things, programs are provided especially for parametrizing geometrical data, for parametrizing technological data, and for rinsing the atomizers and their supply lines during a paint change.

It is important for parametrization that the configuration of the automatic surface-painting machine be known. Corresponding data regarding the configuration are stored in registers of the computer 38. The data relate to the transport velocity, the transport-dependent painting distance between two work regions designated by painting work, and the position of the atomizers with respect to starting cams, which trigger the coating work when a vehicle body passes. The data are represented graphically, for example on the monitor of the computer 38.

In vehicle bodies, but also in other objects to be coated, it often happens that surfaces which have identical dimensions are present on different objects, but have different space coordinates there.

Movement programs for the spraying tools with numerous path points are particularly necessary for larger surfaces extending over curved surfaces.

The surfaces are located, for example, on the side parts, the engine hood, the roof of the vehicle body, etc. The creation of such movement programs is relatively laborious or time-consuming. If movement programs are designated especially for a particular type of body, the programs must be rematched to every other type. The transport velocity of the object to be coated also plays a role in this.

The invention demonstrates a way in which movement programs of spraying tools created for surfaces of particular dimensions and particular geometrical shapes can be used in different objects when the surfaces of the different objects are identical, but assume different positions in space with respect to the reference coordinates. Identical surfaces having identical geometrical shapes means that, with respect to the surface, the spraying tools must have identical distance when traveling the path during application of a particular paint. Thus, the spraying tools cover the same paths, which are also a function of the velocity of the spraying tool(s).

To be able to use the paths predetermined for a surface by means of a movement program for the spraying tool(s) for objects that have an identical surface but are in different spatial positions, it is provided that the distance of the movement paths is displaced as a function of the distance from at least one line on the surface obtained as a function of the shape of the surface. In a very simple case, when the respective surface has two symmetrical halves, one line suffices, namely the line of symmetry, which is cut on the surface of one plane and either lies in the plane of two intersecting coordinate axes of a Cartesian coordinate system or is parallel to this plane.

Which plane is selected depends on the selection of the position of the coordinate system with respect to the object to be coated, and thus on the surface to be coated.

The paths for the spraying tool(s) are displaced corresponding to this line of symmetry.

The displacement of the paths occurs through the modification of the path points to be passed through by the spraying tool(s); this modification is a function of the line of symmetry. The modification takes place during the movement of the object as a function of the position of the object, which is detected by sensors, with respect to the spraying device. The transport velocity of the respective object to be coated is also determined by the sensor(s). The path points are determined with consideration of the transport velocity of the object. The determination of the respective path points is effected by a processor, and is subsequently converted into positioning signals for the drives of the spraying tool(s).

When a line of symmetry or a line related to the plane of the intersecting coordinate axis on the surface suffices for the modification of the path points of the programmed movement path, then not all coordinate values of the path points, but only the coordinate values in the direction perpendicular to the transport direction, need to be modified. This can be performed relatively quickly online by a processor by means of scanning the predetermined line of symmetry. The line of symmetry can also be designated as the contour of the path.

It may be necessary to establish more lines for the surfaces to be coated. These lines lie in parallel planes having, for example, equal spacing from one another. The planes are parallel to the plane extending through two coordinate axes. One of the coordinate axes extends in the transport direction of the objects, whereas the other is at a right angle in the horizontal.

The points of the movement path are modified such that the coating velocity on the surface is always the same, regardless of the transport velocity and the position of the respective surface in space.

Technological data for the respective vehicle body 1 to be coated are stored in the control unit 6. These data relate to, for example, process parameters, e.g. coating parameters, and the type of vehicle body.

With the device illustrated in FIG. 1, vehicle bodies for different types can be coated. In the program of the control unit 6, it is determined when a coating step or work step should begin and end, and how long the process lasts. The coating process can be controlled cyclically. Furthermore, a program is included which indicates which of the atomizers 3, 4 is operated at which time.

Moreover, data are present regarding the voltage for the electrical coating field, the throughput quantity per time unit, the air quantity and the rpm. Further data relate to the paint or kind of powder and the types. The control unit 5 contains data on the x-, y-, z-axis position of the atomizers 3, 4 and the magnitude of the painting velocity.

Figure 3:
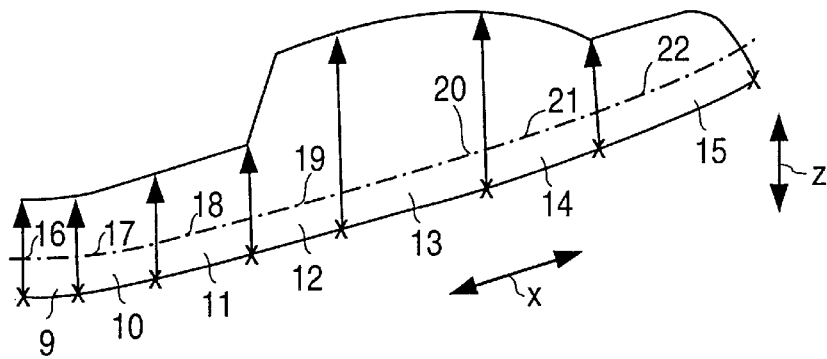
FIG. 3 a diagram of a path covered by the spraying device according to FIG. 1 as a function of the contour.

FIG. 3 schematically shows elements or surfaces which are combined to form a path for a vehicle body to be coated. The surfaces can lie on geometrically different surfaces. In the direction of the x-axis, a series of individual movement programs 9, 10, 11, 12, 14, 15 are present which correspond to the different surfaces of the vehicle body 1; oscillating movements of the spray guns or atomizer pistols 3, 4 are determined by these programs.

In FIG. 3, the programs are designated by the associated surfaces of the vehicle body. The movement programs include path points to be passed through by the spraying tools. The data for modification of the path points are filed in a separate program. Precautions are undertaken in the respective program so that the magnitude of the oscillating movements can be changed as a function of the contour. Therefore, the same programs can be used for different vehicle types which differ from one another essentially in the contour. Vehicles of different types often include surfaces to be coated which are planar or slightly curved, and can be coated with the same oscillating movements. Only the dimensions of these surfaces differ from vehicle type to vehicle type. Hence, the same programs are used whose oscillating movements are influenced by a type-dependent offset.

This type-dependent offset is predetermined by the control device 6, which performs the positioning of the spray guns 3, 4.

The programs 9 through 15 are suited for the coating of surfaces similar to the corresponding surfaces present on the vehicle body following a modification of the path points of the spraying tool movement paths.

It is assumed that the side surfaces which pass the spraying device one after the other during coating of a vehicle by the spraying tool(s) only differ from one another in the axis designated with y in the figure. The modification of the path points of the movement path programs 9 through 15 can then be effected by means of changing the Y-coordinate values of the path points. The modification of the individual path points takes place by means of so-called offsets, whose spacing in the Y-coordinate direction corresponds to a reference line on the surface of the X-coordinate plane.

Figure 4:
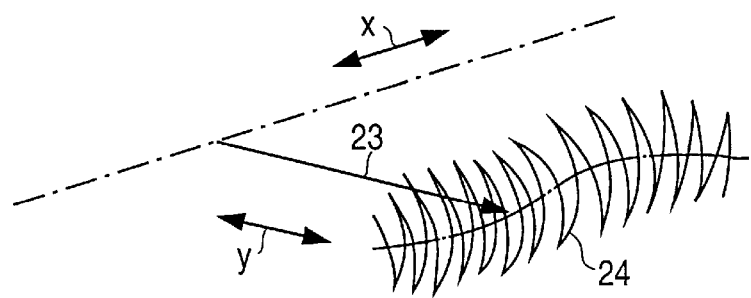
FIG. 4 schematically, an oscillating movement path.

FIG. 3 shows the different offsets 16, 17, 18, 19, 20, 21, 22 of the movement points with respect to a reference axis of the spraying tool for the different programs 9 through 15. Within a program the offset is changed, for example, constantly according to a predetermined function. Furthermore, a constant transition between different programs is possible. The offsets determine a vehicle contour in a plane parallel to the plane in which the X-Y-coordinate axes intersect. FIG. 4 shows an offset 23 in the y-direction for a program of an oscillation path 24, with which, for example, the region between the side part and roof on a vehicle body is intended to be coated. The offset 23 is preferably taken directly from a CAD system employed in the construction.

Because only one path and one type-related contour are usually necessary for the constant movement of the respective atomizer, offline programming devices are not necessary.

The path programs are called up from the second control unit 6 depending on the displacement. The oscillating movements occur, for example, in the y-plane.

The spraying tools 30 through 34 are controlled with corresponding movement programs. The modification of the path points of the movement programs 9 through 15 occurs as a function of velocity.

A sensor 40 determines, on the one hand, the position of the vehicle body 1 with respect to the spraying tools 3, 4 or their position in a horizontal reference plane that extends transversely to the transport direction. Furthermore, a velocity-detection device is provided which determines, for example, the transport velocity at one location. With the velocity it is calculated when the different surfaces to be coated will arrive at the spraying device. The path programs 9 through 15 are activated at the appropriate times. The modification of the offset takes place not only as a function of the distance of the lines 16 through 22 from a reference line in the X-coordinate direction, but also as a function of velocity. This means that the oscillation paths change as a function of the velocity for the purpose of uniform paint application on the body 1.

The data related to the offset 16 through 22 are contained in a separate program, and are retrieved as a function of the position of the respective surface to be coated in reference to the spraying device. The modification of the movement paths further takes place as a function of the paint, namely the consistency of the paint. For uniform coating, many paints require other distances of the spraying tools from the surfaces to be coated. This is set by means of the offset. With the movement program, a modification of the movement paths can also take place with respect to their reversal points.

In objects such as vehicle bodies, the reversal points of the spraying tools, for example, are fixed at the lower edges and in one line, whereas the upper reversal points are contact-dependent. It is then possible to also set the upper reversal points as a function of the distance from the line of the lower reversal points, while the upper reversal points are determined by the vertical dimensions of the surfaces to be coated. In FIG. 3 the upper reversal points are marked by arrows not shown in more detail.

The outline of the vehicle in the vertical plane, i.e. the vehicle projected onto a vertical plane thus determines a contour with which the reversal points are set in that, for example, the points on the upper curve of the outline are selected and entered into the movement program with a supplement as reversal points. The paint supply is then deactivated when the spraying tools are moved out by way of the path point predetermined by the outline.

The type of respective vehicle body is either entered into the control unit by hand prior to passing into the respective spraying device, or automatically signaled to the control unit by means of sampling a code. Using the type information, the control unit then selects the movement program and the contour data with which the path data are modified.

Figure 5:
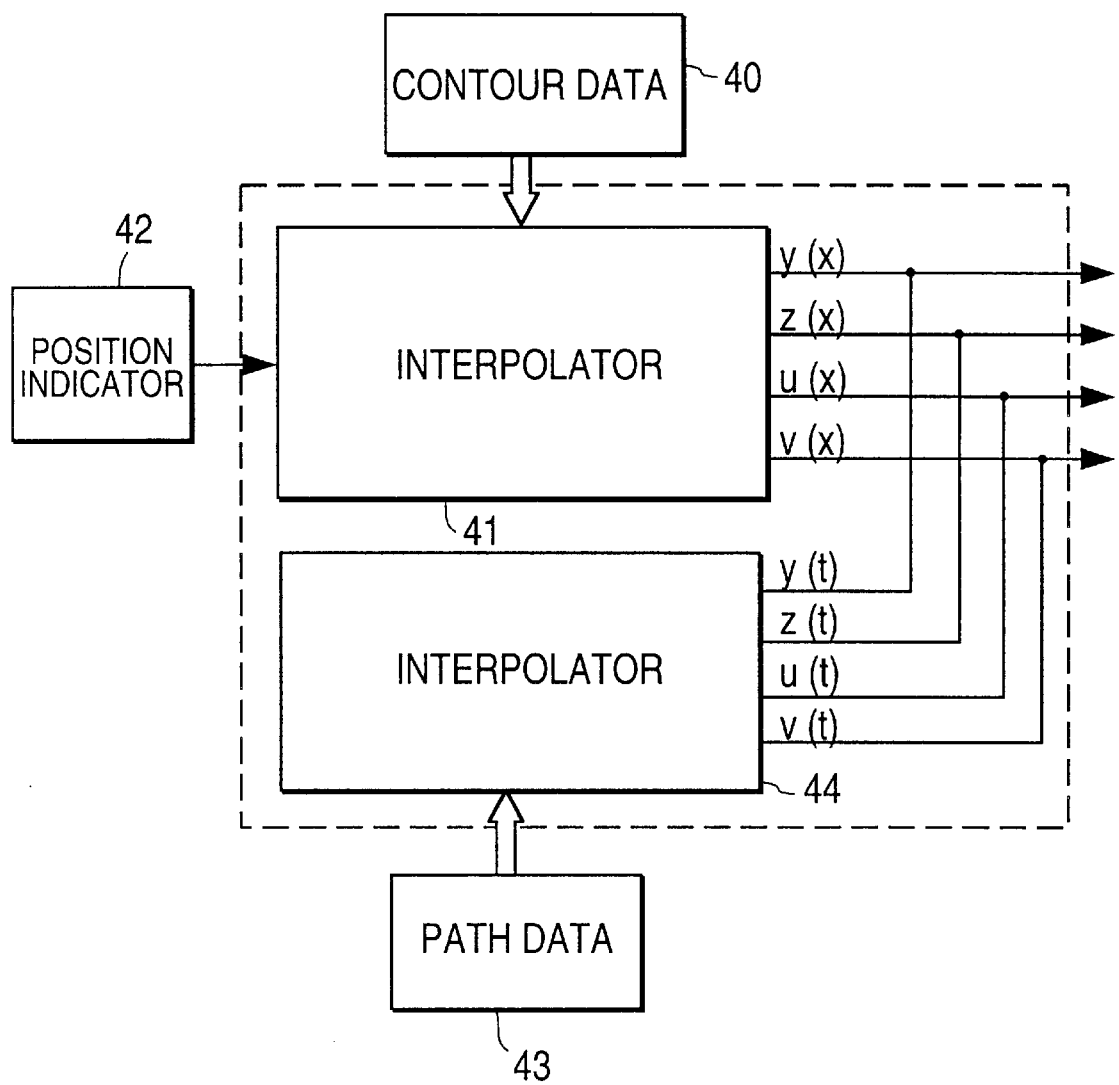
FIG. 5 a functional module for contour-dependent path control.

FIG. 5 shows a functional module for path control. The contour data can be generated with 3 or 4 axes numerical control (hereinafter 3/4-D contour data) determined for the objects are contained in one assembly 40, and are supplied to an interpolator 41, which is controlled as a function of position with a position indicator 42, which determines the positions of the object.

The path data of the movement path are contained in a 3/4-D path data memory 43, and are supplied to an interpolator 44, which performs an interpolation as a function of velocity or time. The interpolator 41 emits setting signals for the movements in, for example, four axes. The setting signals are designated with y(x), z(x), u(x) and v(x).

The interpolator 44 likewise emits setting signals in the four axes which are designated with y(t), z(t), u(t) and v(t).

In the respective axes, associated signals of interpolation are superposed onto one another and emitted to the drives of the coating machine.

I claim:

1. A method of automatically coating objects having length, width and height dimensions, with a spraying control device, which spraying control device includes at least one spraying tool that is movable under program control by a processor on movement paths by a three- or four-axis device, while the objects are moving in one transport direction, comprising:
    providing the processor with a movement program for the at least one spraying tool for objects which differ with respect to their dimensions;
    modifying the movement program based on a length of each of the objects to provide a length-direction path for the at least one spraying tool with respect to the length of the respective objects, wherein the length direction is associated with one axis of a Cartesian coordinate system and extends in the transport direction;
    storing data related to at least one outer contour of a surface of each of the objects extending in a direction perpendicular to the length direction and utilizing the data to provide contour-direction paths extending in at least one direction perpendicular to the length direction for the at least one spraying tool;
    superposing the contour-direction paths of the at least one spraying tool to the length-direction path to adapt the length-direction path to the dimensions of the object in a direction perpendicular to the length direction, thereby generating a resulting path for the at least one spraying tool;
    moving the at least one spraying tool along said resulting path; and
    spraying the objects by the at least one spraying tool moving along said resulting path.

2. The method of claim 1, wherein for objects which include surfaces to be coated by the at least one spraying tool using identical movement paths, related to the dimensions and the shape of the surfaces, distances of the movement paths to be covered by the at least one spraying tool from path coordinates are dependent on the distance of at least one contour line on a respective surface with respect to a coordinate axis extending in the transport direction of the objects.

3. The method of claim 2, wherein the contour line is formed by a plane cutting the surface that is either that plane in which lies the first coordinate axis and a second coordinate axis that intersects this axis at a right angle and passes through the same point of origin and lies along a direction of displacement of the at least one spraying tool with respect to the object, or is parallel to this plane.

4. The method of claim 1, wherein movement paths are modified based on a transport velocity of the objects.

5. The method of claim 1, wherein coordinate values of path points of a movement program provided for a respective surface of the objects are preselected in at least one coordinate direction as a function of distance, and wherein additional path points for the movement path of the at least one spraying tool are interpolated between adjacent path points.

6. A method of coating objects according to claim 1, wherein the objects are vehicle bodies.

7. A method of automatically coating objects with a spraying control device, which spraying control device includes at least one spraying tool that is movable under program control on movement paths by a three- or four-axis device, while the objects are moving in one transport direction, comprising:
    providing a first programmable controller connected to the three- or four-axis device of the at least one spraying tool;
    storing in the first programmable controller a movement program to be processed by a processor, which movement program is related to the objects which differ with respect to their dimensions, the movement program being modified based on a length of each of the objects, thereby providing a length-direction movement path to the at least one spraying tool;
    wherein the length direction is associated with one axis of a Cartesian coordinate system extending in the transport direction;
    providing a second programmable controller storing a program providing a contour-direction movement path for the at least one spraying tool, with the contour-direction movement path being related to at least one outer contour of a surface of each of the objects extending in a direction perpendicular to the length direction and extending in at least one direction perpendicular to the length direction, the second programmable controller being connected to said first programmable controller;
    superposing the length-direction movement path and the contour-direction movement path to adapt the length-direction movement path to the dimensions of the object in a direction perpendicular to the length direction and create a resulting path for the at least one spraying tool;
    moving the at least one spraying tool along said resulting path; and
    spraying the objects by the at least one spraying tool moving along said resulting path.

8. A device for automatically coating objects, comprising:
    a spraying device which includes at least one spraying tool movable under program control on paths by a three- or four-axis actuating means for actuation, while the objects are moving in one transport direction;
    a first programmable controlling means for first program control being connected to the three- or four-axis actuating means of the at least one spraying tool;
    first memory means for storing a movement program which is provided for the objects which differ with respect to their dimensions;

modifying means for modifying the movement program based on a length of each of the objects to provide a length-direction movement path to the at least one spraying tool with respect to the length of the respective objects;

wherein the length direction is associated with one axis of a Cartesian coordinate system extending in the transport direction;

a second programmable controlling means for second program control having second memory means for storing programs providing a contour-direction movement path for the at least one spraying tool, with the contour-direction movement path being related to a contour of each of the objects, and extending in at least one direction perpendicular to the length direction, the second programmable controlling means being connected to said first programmable controlling means; and superposing means for superposing the length-direction movement path and the contour-direction movement path to adapt the length-direction movement path to the dimensions of the object in the direction perpendicular to the length direction and to create a resulting movement path for the at least one spraying tool.

* * * * *